(12) United States Patent
Hada et al.

(10) Patent No.: US 8,040,310 B2
(45) Date of Patent: Oct. 18, 2011

(54) METHOD OF DRIVING DISPLAY APPARATUS AND DISPLAY APPARATUS

(75) Inventors: Akihiro Hada, Matsusaka (JP); Akihisa Iwamoto, Matsusaka (JP); Kazuki Ohfuku, Taki-gun (JP); Masakazu Takeuchi, Taki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 562 days.

(21) Appl. No.: 11/075,282

(22) Filed: Mar. 9, 2005

(65) Prior Publication Data
US 2005/0212744 A1  Sep. 29, 2005

(30) Foreign Application Priority Data
Mar. 10, 2004  (JP) .................................. 2004-067222

(51) Int. Cl.
 *G09G 3/36* (2006.01)
(52) U.S. Cl. .......................................... 345/96; 345/87
(58) Field of Classification Search ............ 345/87–104, 345/208–20; G09G 3/36
See application file for complete search history.

(56) References Cited

U.S. PATENT DOCUMENTS

| 5,493,427 A * | 2/1996 | Nomura et al. .................... 349/5 |
| 6,295,043 B1 | 9/2001 | Hashimoto et al. |
| 6,304,242 B1 * | 10/2001 | Onda .............................. 345/99 |
| 7,397,444 B2 * | 7/2008 | Tomono ............................ 345/6 |
| 7,499,115 B2 * | 3/2009 | Kumagawa et al. ............ 349/37 |
| 2001/0000662 A1 | 5/2001 | Hashimoto et al. |
| 2002/0011984 A1 * | 1/2002 | Shirochi et al. ................. 345/96 |
| 2004/0196302 A1 * | 10/2004 | Im et al. ........................ 345/690 |

FOREIGN PATENT DOCUMENTS

| JP | 1-179579 A |  | 7/1989 |
| JP | 3-119889 |  | 5/1991 |
| JP | 03119889 A | * | 5/1991 |
| JP | 5-307164 A |  | 11/1993 |
| JP | 2004045741 A | * | 2/2004 |

* cited by examiner

*Primary Examiner* — Alexander Eisen
*Assistant Examiner* — Christopher E Leiby
(74) *Attorney, Agent, or Firm* — Nixon & Vanderhye P.C.

(57) ABSTRACT

A display apparatus according to the present invention is provided with a matrix-type liquid crystal panel and a switching liquid crystal panel, the matrix-type liquid crystal panel and the switching liquid crystal panel assembled together. In the display apparatus, a polarity of a voltage applied on an electrode pair of the switching liquid crystal panel is inverted once in substantially one vertical period or in one or more vertical period. With this arrangement, it is possible to reduce a number of bright line or dark line. This attains display quality improvement and power consumption reduction.

12 Claims, 15 Drawing Sheets

METHOD OF DRIVING DISPLAY APPARATUS AND DISPLAY APPARATUS

This Nonprovisional application claims priority under 35 U.S.C. §119(a) on Patent Application No. 2004/067222 filed in Japan on Mar. 10, 2004, the entire contents of which are hereby incorporated by reference.

FIELD OF THE INVENTION

The present invention relates to a method of driving (addressing) a display apparatus (for use in OA (Office Automation) apparatus, AV (Audio Visual) apparatus, and the like apparatus) having a structure in which a liquid crystal panel and a matrix-type image display means are assembled together, and to the display apparatus.

BACKGROUND OF THE INVENTION

A display apparatus having a structure in which a liquid crystal panel is provided is conventionally well known as one type of matrix-type display apparatus. One example of such a display apparatus is one having a structure in which a dot-matrix-type display apparatus (for example, M-row/N-column active matrix liquid crystal panel) is assembled together with a liquid crystal panel for switching two-dimensional (2-D) display and three-dimensional (3-D) display (hereinafter, this kind of liquid crystal panel is referred to as a switching liquid crystal panel), and being able to electrically switching the two-dimensional display and the three-dimensional display (e.g. see Publication of Japanese Patent Application, Tokukaihei, publication No. 3-119889 (published on May 22, 1991).

FIGS. 12 and 13 illustrates cross sections of a panel section of the liquid crystal display apparatus for dual-display of two-dimensional and three-dimensional images. FIG. 12 illustrates the cross section of the panel section when the three-dimensional image is displayed. FIG. 13 illustrates the cross section of the panel section when the two-dimensional image is displayed. As illustrated in FIGS. 12 and 13, the liquid crystal display apparatus for dual-display of the two-dimensional image and the three-dimensional image is provided with a dot-matrix type liquid crystal panel 101 and a switching liquid crystal panel 102 assembled together.

The dot-matrix liquid crystal panel 101 is provided with a polarizer 111, a counter electrode 112, a liquid crystal layer 113, a pixel electrode 114, and a polarizer 115, which are arranged in lamination. The pixel electrode 114 is provided with an active element (not illustrated). The active element is turned ON/OFF in accordance with a scanning signal inputted from a scanning electrode control circuit (not illustrated). When the active element is ON, a video signal is inputted from a video signal control circuit (not illustrated) into the pixel electrode 114. In other words, the dot-matrix type liquid crystal panel 101 serves as display image generating means for generating a displayed screen in accordance with image data.

The switching liquid crystal panel 102 is provided with a patterned retardation film 121, an upper electrode 122, a liquid crystal layer 123, a lower electrode 124, and a polarizer 125, which are arranged in lamination. According to whether or not a voltage is applied on the liquid crystal layer 123, the switching liquid crystal panel 102 switches over whether a parallax barrier is present or absent (i.e. whether the parallax barrier is effectuated or not).

The upper electrode 122 and the lower electrode 124 are connected with a power source circuit (not illustrated) for applying a driving voltage on these electrodes. In accordance with whether the two-dimensional image or the three-dimensional image is to be displayed, the power source circuit switches over whether it supplies the voltage or not. For instance, the voltage applications switches over the display to the two-dimensional image display. On the other hand, when no voltage application is made, the display is switched over to the three-dimensional image display. In accordance with whether or not the voltage is applied on the upper electrode 122 and the lower electrode 124, the polarization state of light passing through the liquid crystal layer 123 is switched over.

The patterned retardation film 121 has two types of regions 121A and 121B, which are in a stripe shape and in alternative arrangement. The two types of regions 121A and 121B have different polarization states. The light having passed through the liquid crystal layer 123 enters the patterned retardation film 121. The regions 121A and 121B of the patterned retardation film 121 have different rubbing directions. In other words, their slow axes are in different directions. Therefore, light having passed through the region 121A and light having passed through the region 121B have different polarization state. For instance, it is designed that a polarization axis of the light having passed through the region 121A and that of the light having passed through the region 121B make 90 degrees.

The polarization states of the light having passed through the regions 121A and 121B depend on the polarization state of the light incident on the patterned retardation film 121, that is, the polarization state of the light having passed through the liquid crystal layer 123. The light having passed through the patterned retardation film 121 enter the polarizer 115 of the dot-matrix type liquid crystal panel 101.

When the image is displayed as a three-dimensional image, that is, when no voltage is applied on the liquid crystal layer 123, an optical axis of the light having passed through the region 121A is parallel with a transmission axis of the polarizer 115, but an optical axis of the light having passed through the region 121B is perpendicular to the transmission axis of the polarizer 115.

In other words, as illustrated in FIG. 12, the patterned retardation film 121, working together with the polarizer 115, causes optical effect thereby effectuating functions of a parallax barrier. The regions 121A of the patterned retardation film 121 servers as a transmission region, while the region 121B serves as a blocking region.

Light having passed through the region 121A and the polarizer 115 and traveling toward a right eye (i.e. in a right-eye direction) passes through that part of the liquid crystal layer 113 on which the voltage is applied by a pixel electrode 114R that is for displaying in accordance with image data for the right eye (hereinafter, this image data is referred to as right-eye image data). On the other hand, light having passed through the region 121A and the polarizer 115 and traveling toward a left eye (i.e. in a left-eye direction) passes through that part of the liquid crystal layer 113 on which the voltage is applied by a pixel electrode 114L that is for displaying in accordance with image data for the left eye (hereinafter, this image data is referred to as left-eye image data). The left-eye image data and the right-eye image data are for images which are to be viewed from different observation positions. The display image displayed in accordance with the right-eye image data is viewed with the right eye while the display image displayed in accordance with the left-eye image data is viewed with the left eye. In this way, the display image is recognized as a three-dimensional image.

On the other hand, when the image is displayed as a two-dimensional image, that is, when the voltage is applied on the liquid crystal layer 123, light having passed through the region 121A and light having passed through the region 121B are such that the optical axes thereof are symmetrically tilted from the transmission axis of the polarizer 115.

That is, both of the light having passed through the regions 121A and the regions 121B pass through the polarizer with the same transmittance, thereby not effectuating the function of the parallax barrier. Thus, the image from all the pixels are viewed with the both right and left eyes, thereby allowing the display of the two-dimensional image.

Whether the parallax barrier is effectuated or not is switched over by whether or not applying the voltage on the liquid crystal layer 123 of the switching liquid crystal panel 102, thereby switching over between the two-dimensional image display and the three-dimensional image display.

The liquid crystal display apparatus for dual-use in displaying the two-dimensional image and the three-dimensional image is arranged such that the voltages to be applied on the liquid crystal layers 113 and the 123 of the dot-matrix type liquid crystal panel 101 and the switching liquid crystal panel 102 are inverted in polarity in order to prevent deterioration of display quality. Control circuits respectively controls timing of the polarity inversion of the dot-matrix type liquid crystal panel 101 and the switching liquid crystal panel 102.

Further, a power source circuit for generating the voltage to be supplied to the dot-matrix type liquid crystal panel 101 has a different configuration from that of a power source circuit for generating the voltage to be supplied to the switching liquid crystal panel 102.

In the conventional arrangements, however, no attention is paid to a cycle of the timing of the polarity inversion of the switching liquid crystal panel 102. Thus, the timing of the polarity inversion is not in synchronism with a vertical cycle of the dot-matrix type liquid crystal panel 101. Moreover, in some cases, the polarity inversion cycle is extremely shorter than the vertical cycle of the dot-matrix type liquid crystal panel 101.

The inventors of the present invention noted the significance of the timing of the polarity inversion of the switching liquid crystal panel 102, and a problem associated with the timing of the polarity inversion: the timing may cause display quality deterioration. This problem is explained below.

A position of a polarity inversion point of the switching liquid crystal panel 102 with respect to a vertical display starting point is changed if the timing of the polarity inversion of the switching liquid crystal panel 102 is not in synchronism with the vertical cycle of the dot-matrix type liquid crystal panel 101.

Moreover, the polarity of the switching liquid crystal panel 102 is inverted in plural times within an effective display period of the dot-matrix type liquid crystal panel 101, if the polarity inversion cycle of the switching liquid crystal panel 102 is extremely shorter than the vertical cycle.

FIG. 14 illustrates waveforms of the voltage applied on the dot-matrix type liquid crystal panel 101 and the switching liquid crystal panel 102 in the conventional arrangement. In FIG. 14, the upper waveform represents the vertical display start signal of the dot-matrix type liquid crystal panel 101. The middle waveform is a waveform of the voltage applied on the pixel electrode 114 of the dot-matrix type liquid crystal panel 101. The lower waveform is a waveform of the voltage applied on the switching liquid crystal panel 102.

As illustrated in FIG. 14, one vertical period has the effective display period and blanking period: the voltage is applied on the pixel electrodes on 1 to N lines (i.e. 1 to N rows) in the effective display period; and the blanking period is a rest of the one vertical period. In FIG. 14, the polarity of the switching liquid crystal panel 102 is inverted four times in the effective display period.

Moreover, it can be understood from FIG. 14 that the polarity inversion of the switching liquid crystal panel 102 in accordance with the vertical display start signal occurs at different points in respective vertical periods.

The inventors of the present inventions found out that, due to capacity coupling occurred between the upper electrode 122 of the switching liquid crystal panel 102 and pixel electrode 114 of the dot-matrix type liquid crystal panel 101, an video signal to be inputted in the pixel electrode 114 is fluctuated in accordance with the inversion of the voltage applied on the switching liquid crystal panel 102, the fluctuation taking place at the timing of polarity inversion of the voltage applied on the switching liquid crystal panel 102.

FIG. 15 illustrates a waveform of the video signal when the voltage applied on the switching liquid crystal panel 102 is inverted.

As illustrated in FIG. 15, at a timing a at which the voltage applied on the switching liquid crystal panel 102 (i.e. the voltage between the upper electrode 122 and the lower electrode 124) is inverted from the negative polarity to the positive polarity, the video signal is shifted toward a positive direction. On the other hand, as a timing b at which the voltage is inverted from the positive polarity to the negative polarity, the video signal is shifted toward a negative direction.

Therefore, a pixel electrode whose active element is ON at the timing a is excessively charged when the video signal is a signal shifted to the positive direction. On the other hand, this pixel electrode is not sufficiently charged when the video signal is a signal shifted to the negative direction. Moreover, a pixel electrode whose active element is ON at the timing b is not sufficiently charged when the video signal is a signal shifted to the positive direction. On the other hand, this pixel electrode is excessively charged when the video signal is a signal shifted to the negative direction.

The excess charging on the pixel electrode causes a dark line on the displayed screen. Moreover, the insufficient charging on the pixel electrode causes a bright line on the displayed screen.

Therefore, if the polarity of the switching liquid crystal panel 102 is inverted in plural times within one effective display period as described above, a plurality of bright lines or dark lines appear, causing display deterioration. Further, in case where the polarity inversion point of the inversion carried out in accordance with the vertical display start signal is changed per vertical period, the bright line or the dark line flows on the screen.

The inventors of the present invention found the problem associated with the polarity inversion of the voltage applied on another liquid crystal panel in the display apparatus configured by assembling a matrix-type liquid crystal panel with the another display panel. The problem is that the polarity inversion causes fluctuation in the voltage applied on the pixel electrode, thereby causing a severe deterioration of display quality.

SUMMARY OF THE INVENTION

An object of the present invention is to realize a method of driving a display apparatus and a display apparatus, with which display quality deterioration caused by the bright line or the dark line can be prevented.

A method according to the present invention is for driving a display apparatus having an image display section for displaying a screen by controlling pixels in accordance with image data per vertical period, the pixels arranged in matrix, and a liquid crystal panel having an electrode pair sandwiching a liquid crystal layer therebetween, the image display section and the liquid crystal panel assembled together. In order to attain the object, the method includes the step of inverting polarity of a voltage to be applied on the electrode pair once in substantially one or more vertical periods.

With this method, the occurrence of a bright line or a dark line is reduced to once in substantially one vertical period of the image display means or in one or more vertical periods. Thus, this reduces a number of the bright lines or dark lines, compared with the conventional arrangement in which a plurality of the bright lines or dark lines appear in one vertical period. This improves display quality. Further, because the occurrence of the polarity inversion is reduced, it is possible to reduce power consumption caused by the polarity inversion. As a result, this allows reduction of an overall power consumption.

For a fuller understanding of the nature and advantages of the invention, reference should be made to the ensuing detailed description taken in conjunction with the accompanying drawings.

DESCRIPTION OF THE EMBODIMENTS

First Embodiment

An exemplary embodiment (hereinafter, present embodiment in "First Embodiment") of a display apparatus according to the present invention is described below, referring to FIGS. 1 and 2.

Figure 1:
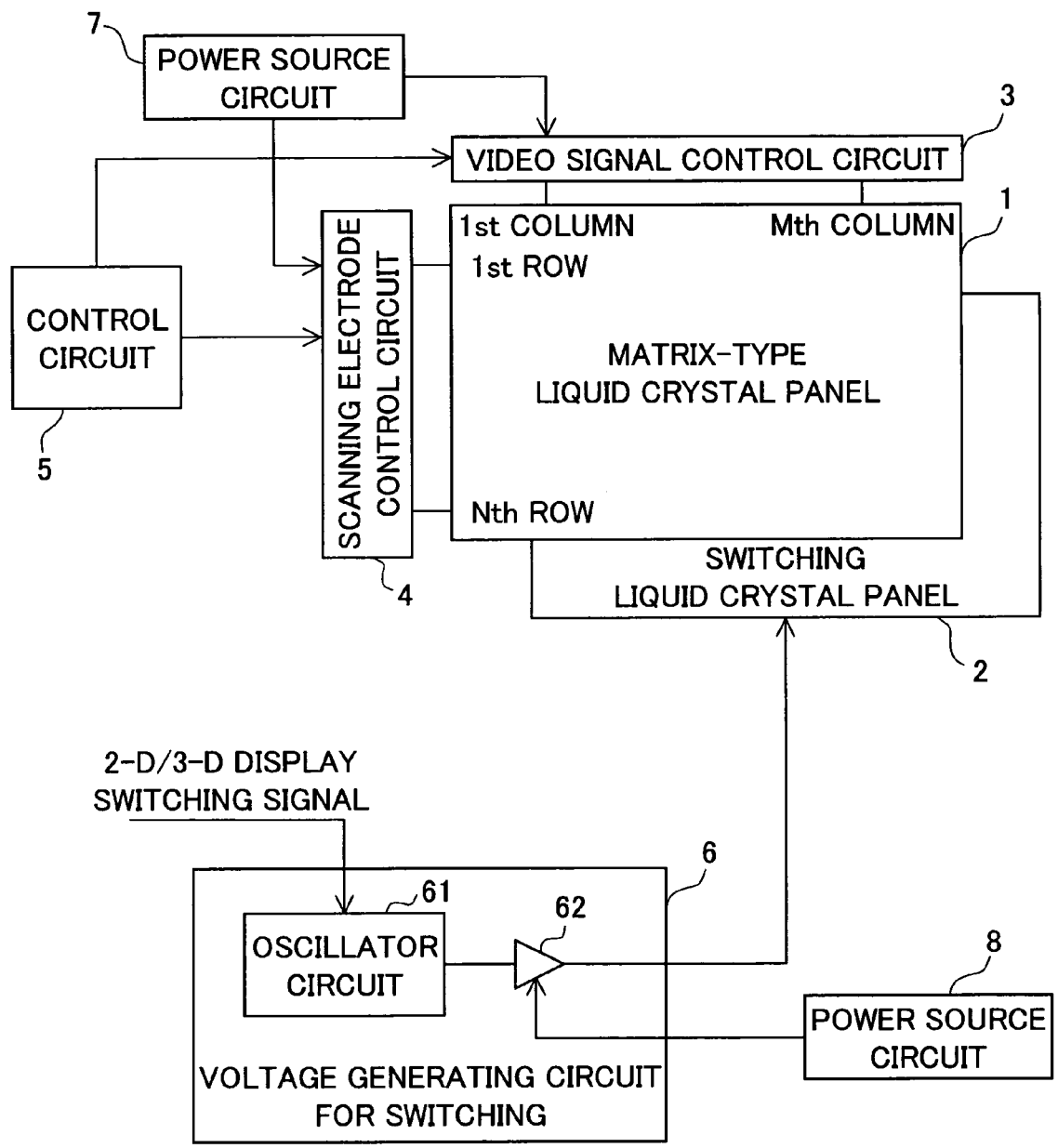
FIG. 1 is a block diagram schematically illustrating a display apparatus according to a first exemplary embodiment of the present invention.

FIG. 1 is a block diagram schematically illustrating an arrangement of the display apparatus of the present embodiment. As illustrated in FIG. 1, the display apparatus of the present embodiment is provided with a matrix-type liquid crystal panel 1, a switching liquid crystal panel 2, a video signal control circuit 3, a scanning electrode control circuit 4, a control circuit 5, a switching voltage generating circuit 6, and power source circuits 7 and 8.

Figure 12:
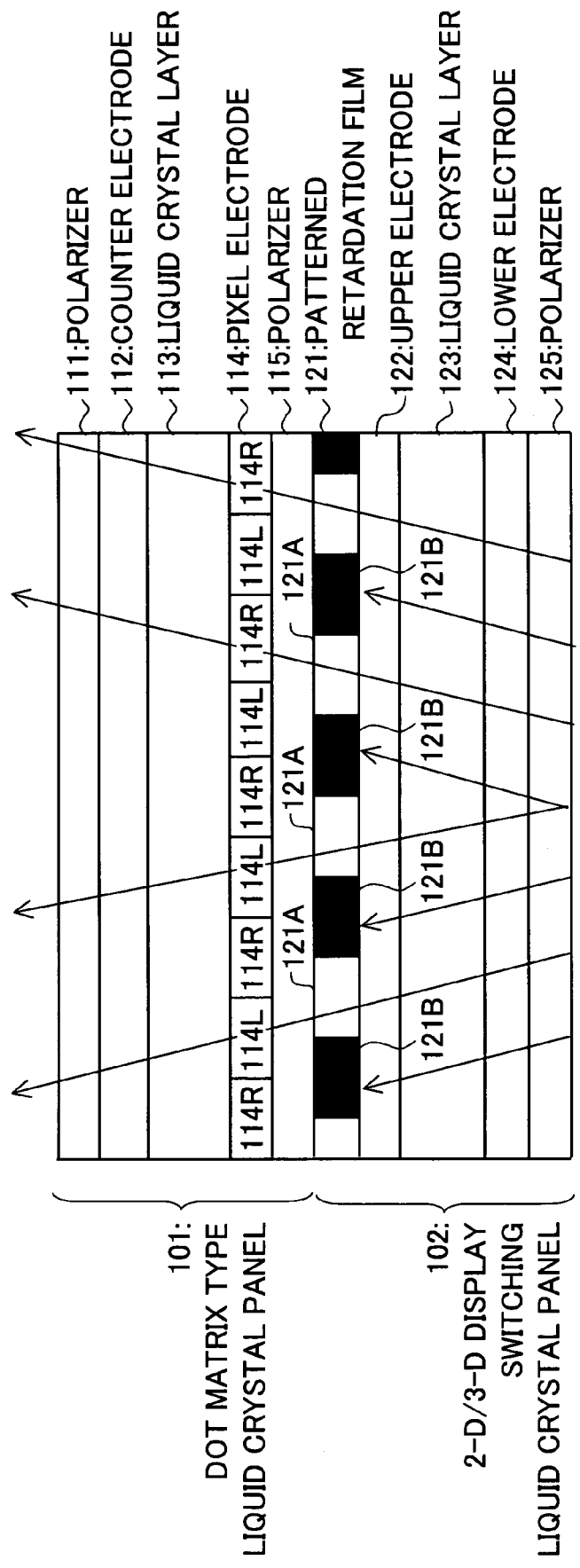
FIG. 12 is a cross sectional view illustrating a conventional liquid crystal display apparatus for dual use in displaying 2-D/3-D image. The conventional liquid crystal display apparatus in FIG. 12 is displaying a 3-D image.
Figure 13:
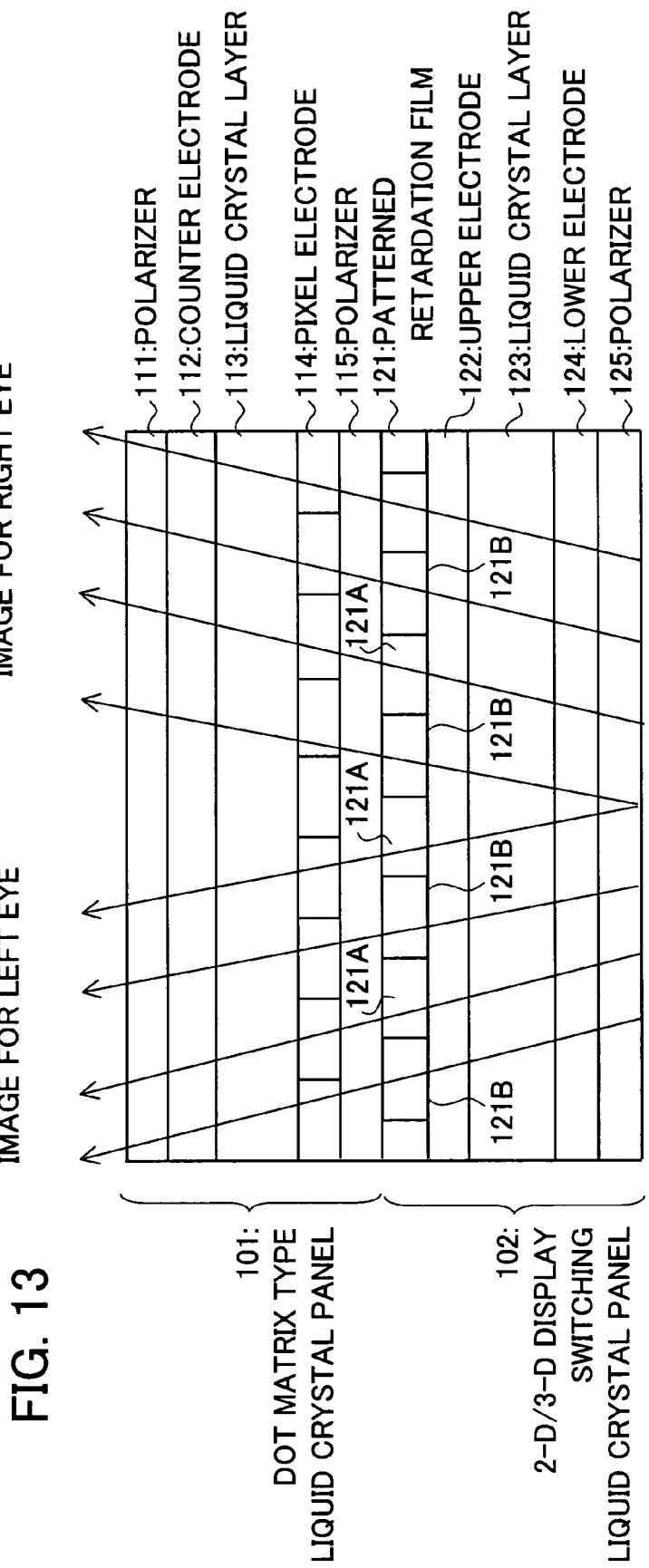
FIG. 13 is a cross sectional view illustrating the conventional liquid crystal display apparatus for dual use in displaying 2-D/3-D image. The conventional liquid crystal display apparatus in FIG. 13 is displaying a 2-D image.

The matrix-type liquid crystal panel 1 is, e.g., an active matrix type liquid crystal panel. The matrix-type liquid crystal panel 1 is configured such that first (1st) to Nth scanning lines and first (1st) to Mth signal lines are arranged to cross each other (i.e. in a matrix). In each region segmented with the scanning lines and the signal lines, a pixel section (not illustrate) is formed. In the pixel section, a polarizer 111, a counter electrode 112, a liquid crystal layer 113, a pixel electrode 114 and a polarizer 115 are arranged in lamination in this order as illustrated in FIG. 12. In other words, the counter electrode 112 and the pixel electrode 114 constitute an electrode pair, sandwiching the liquid crystal layer 113 therebetween.

The pixel electrode 114 of each pixel section is connected with an active element (not illustrated). An example of the active element is a thin film transistor (TFT). The active element is connected with the scanning line and the signal line. The active element is turned ON/OFF in accordance a scanning signal inputted from the scanning line. When the active element in an ON state, the active element supplies, to the pixel electrode 114, a video signal inputted from the signal line.

The scanning electrode control circuit 4 is for outputting the scanning signal to an N number of scanning lines, the scanning signal controlling the ON and OFF of the active element of the matrix-type liquid crystal panel 1. The scanning electrode control circuit 4 is connected with the power source circuit 7, which supplies power to the scanning electrode control circuit 4.

Moreover, the scanning electrode control circuit 4 is connected with the control circuit 5, and receives a vertical display start signal and a horizontal synchronizing signal outputted from the control circuit 5. If it receives the vertical display start signal, the scanning electrode control circuit 4 will output, to the 1st scanning line, the scanning signal that is to turn ON the active element connected to the 1st scanning line. After that, at a timing of the horizontal scanning signal the scanning electrode control circuit 4 outputs, to the 1st scanning line, a scanning signal that is to turn OFF the active element. At the same time the scanning electrode control circuit 4 outputs, to the second (2nd) scanning line, the scanning signal that is to turn ON the active element. In this way, the scanning electrode control circuit 4 outputs the scanning signals to the 1st to Nth scanning lines at the timing of the horizontal synchronizing signal.

The video signal control circuit 3 is for supplying the video signal (image data) to the pixel electrodes of the matrix-type liquid crystal panel 1 via an M number of signal lines. Specifically speaking, the video signal control circuit 3 applies, on the pixel electrodes, a voltage that corresponds to the video signal. The video signal control circuit 3 is connected with the power source circuit 7. The power source circuit 7 supplies power to the video signal control circuit 3.

Moreover, the video signal control circuit 3 is connected with the control circuit 5. The video signal control circuit 3 receives the vertical display start signal and the horizontal synchronizing signal outputted from the control circuit 5. If it receives the vertical display start signal the video signal control circuit 3 will output, to 1st to Mth signal lines, a video signal for a first (1st) row. Next, at a timing of the horizontal scanning signal, the video signal control circuit 3 outputs a video signal for a second (2nd) row. In this way, the video signal control circuit 3 sequentially outputs, to the 1st to Mth signal lines, video signal for 1st to Nth rows at the timing of the horizontal synchronizing signal.

The control circuit 5 is for generating the vertical display start signal and the horizontal synchronizing signal and outputting the signals to the video signal control circuit 4 and the scanning electrode control circuit 3.

The switching liquid crystal panel 2 is assembled together with the matrix-type liquid crystal panel 1. The switching liquid crystal panel 2 is for switching over, e.g., 2-dimensional (2-D) image display and 3-dimensional (3-D) image display by a voltage applied thereon. Here, the voltage may be 0 V. The switching liquid crystal panel 2 is, as illustrated in FIG. 12, provided with a patterned retardation film 121, an upper electrode 122, a liquid crystal layer 123, a lower electrode 124, and a polarizer 125, which are arranged in lamination in this order. In other words, the upper electrode 122 and the lower electrode 124 constitute an electrode pair sandwiching the liquid crystal layer 123.

The all pixel sections of the matrix-type liquid crystal panel 1 include the patterned retardation film 121, the upper electrode 122, the liquid crystal layer 123, the lower electrode 124, and the polarizer 125. Therefore, it is possible to apply the voltage on an entire screen via the upper electrode 122 and the lower electrode 124 at once.

The switching liquid crystal panel 2 is connected with the switching voltage generating circuit 6 for generating a voltage that is to be applied for switching over the display. The voltage generated by the switching voltage generating circuit 6 is applied between the upper electrode 122 and the lower electrode 124. In this embodiment, it is put that for performing the 2-D display, the voltage is applied on the switching liquid crystal panel 2, meanwhile, for performing the 3-D display, no voltage is applied on the switching liquid crystal panel 2.

The switching voltage generating circuit 6 generates the voltage that is to be applied on the switching liquid crystal panel 2. In accordance with a 2-D/3-D display switching signal, the switching voltage generating circuit 6 switch over whether or not the voltage is applied on the switching liquid crystal panel 2. In other words, the switching voltage generating circuit 6 is control means for controlling driving of the switching liquid crystal panel 2.

Further, the switching voltage generating circuit 6 switches over a polarity of the voltage to be applied. In order to switch over the polarity of the voltage, the switching voltage generating circuit 6 changes the voltages to be applied respectively on the upper electrode 122 and the lower electrode 124 of the switching liquid crystal panel 2. Specifically speaking, the switching voltage generating circuit 6 decreases the voltage for the upper electrode 122 while increasing the voltage for the lower electrode 124, in order to invert the polarity from positive to negative. To the contrary, in order to invert the polarity from negative to positive, the switching voltage generating circuit 6 increases the voltage for the upper electrode 122 while decreasing the voltage for the lower electrode 124. By applying different voltages on the upper electrode 122 an the lower electrode 124, a necessary power source voltage can have a smaller range, thereby attaining reduction of power consumption.

The switching voltage generating circuit 6 is provided with an oscillator circuit 61 and a buffer circuit 62.

The oscillator circuit 61 is for generating an inversion timing signal that indicates the timing for the polarity inversion of the voltage to be applied on the switching liquid crystal panel 2.

The oscillator circuit 61 receives the 2-D/3-D display switching signal from outside. If a 2-D/3-D display switching signal representing the 2-D display is inputted into the oscillator circuit 61, the oscillator circuit 61 oscillates at a predetermined timing and generates the inversion timing signal representing the timing. The oscillator circuit 61 applies, via the buffer circuit 62, the voltage onto the upper electrode 122 and the lower electrode 124 of the switching liquid crystal panel 2, the polarity of the voltage being inverted in accordance with the inversion signal thus generated.

On the other hand, if a 2-D/3-D display switching signal representing the 3-D display is inputted into the oscillator circuit 61, the oscillator circuit 61 performs no oscillation (i.e. does not generate the inversion timing signal) and applies no voltage on the upper electrode 122 and the lower electrode 124 of the switching liquid crystal panel 2.

The buffer circuit 62 is for applying a predetermined voltage on the switching liquid crystal panel 2. The buffer circuit 62 is connected to the oscillator circuit 61 and the power source circuit 8. If the inversion signal is inputted in the buffer circuit 62 from the oscillator circuit 61, the buffer circuit 62 will receive power supplied from the power source circuit 8, and output a predetermined voltage to the switching liquid crystal panel 2. In accordance with the inversion timing signal from the oscillator circuit 61, the buffer circuit 62 inverts the polarity of the voltage that the buffer circuit 62 is to output. If no signal is inputted from the oscillator 61 into the buffer circuit 62, the buffer circuit 62 does not output the voltage to the switching liquid crystal panel 2.

As described above, if the switching voltage generating circuit 6 receives the 2-D/3-D display switching signal representing the 2-D display, the switching voltage generating circuit 6 will generate the inversion signal and output the inversion signal to the switching liquid crystal panel 2, the polarity of the inversion signal inverted in accordance with the inversion timing signal. On the other hand, if the switching voltage generating circuit 6 receives the 2-D/3-D display switching signal representing the 3-D display, the switching voltage generating circuit 6 will output no voltage to the switching liquid crystal panel 2.

Next, a driving method of the matrix-type liquid crystal panel 1 and the switching liquid crystal panel 2 is described.

The oscillator circuit 61 of the switching voltage generating circuit 6 in the present embodiment generates the inversion timing signal once a vertical period of the matrix-type liquid crystal panel 1.

More specifically, the oscillator circuit 61 generates the inversion timing signal at a frequency that is substantially ½ of a frequency corresponding to one vertical period of the matrix-type liquid crystal panel 1. FIG. 2 illustrates a waveform of a voltage applied on the matrix-type liquid crystal panel 1 and the switching liquid crystal panel 2.

Figure 2:
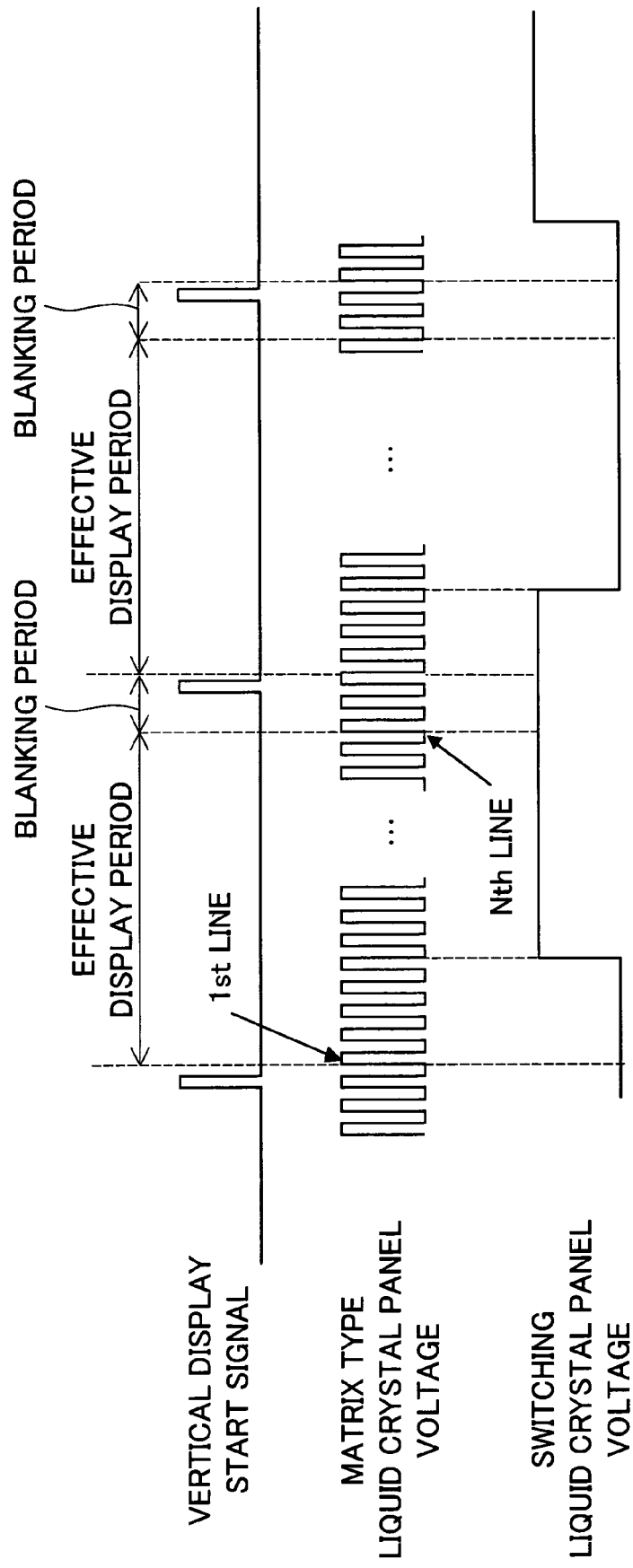
FIG. 2 is a view illustrating waveforms of applied voltage in the display apparatus according to the first exemplary embodiment.
Figure 14:
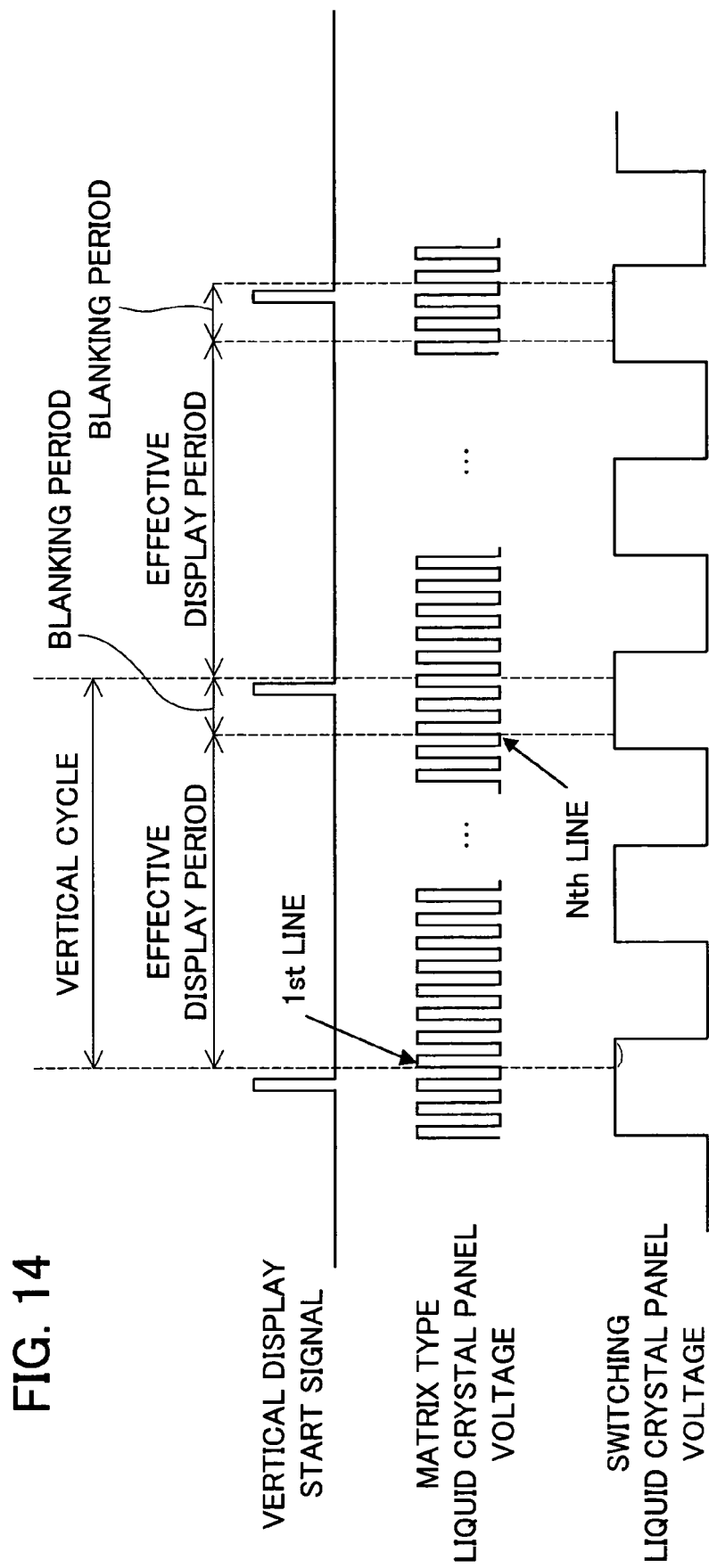
FIG. 14 is a view illustrating waveforms of applied voltages in the display apparatus illustrated in FIGS. 12 and 13.

As illustrated in FIG. 2, the polarity inversion of the voltage applied on the switching liquid crystal panel 2 is carried out once within one vertical period of the matrix-type liquid crystal panel 1. That is, a number of times the polarity inversion in the switching liquid crystal panel 2 takes place in one vertical period is less than that in a conventional driving method illustrated in FIG. 14.

This makes it possible to reduce a number of bright lines or dark lines compared with a conventional arrangement, the bright lines and dark lines caused respectively due to excess charging or insufficient charging of the pixel electrode as a result of the polarity inversion of the voltage applied on the switching liquid crystal panel 2. This attains improvement of the display quality.

Moreover, because the cycle of the polarity inversion period of the voltage of the switching liquid crystal pane 2 becomes longer than the conventional arrangement, a current consumption required by the switching voltage generating circuit 6 can be reduced.

Even though the present embodiment is arranged such that the switching voltage generating circuit 6 generates the inversion timing signal once in one vertical period of the matrix-type liquid crystal panel 1. However, the present invention is not limited to this. The switching voltage generating circuit 6 may be arranged such that it generates the inversion timing signal once in two or more vertical periods of the matrix-type liquid crystal panel 1. With this arrangement, the polarity inversion of the voltage applied on the switching liquid crystal panel 2 is carried out once within two or more vertical periods of the matrix-type liquid crystal panel 1. As a result, the bright line or the dark line appear once in two or more vertical period. This renders the bright line or the dark line less visible and harder to recognize.

Second Embodiment

The first embodiment is arranged such that the vertical display start signal is generated by the control circuit 5 of the matrix-type liquid crystal panel 1, and the inversion timing signal representing the timing of the polarity inversion of the voltage applied on the switching liquid crystal panel 2 is generated by the switching voltage generating circuit 6. That is, the vertical display start signal and the inversion timing signal are generated in different configuration blocks.

In this arrangement, there is a possibility that a pulse of the vertical display start signal and a pulse of the inversion timing signal would have a time lag, which would be different in each vertical period. In other words, there is a possibility that the inversion point of the inversion of the switching liquid crystal panel 2 would be changed with respect to the vertical display start signal. If the time lag is changed in each vertical period, the bright line or the dark line flows on the displayed screen. A second exemplary embodiment (hereinafter, referred to as the present embodiment in "Second Embodiment") has a preferable arrangement that avoids this problem.

A display apparatus according to the present embodiment is described below, referring to FIGS. 3 to 6. For the sake of easy explanation, sections having the same functions as those described in the first embodiment are labeled in the same manner and their explanation is omitted here.

Figure 3:
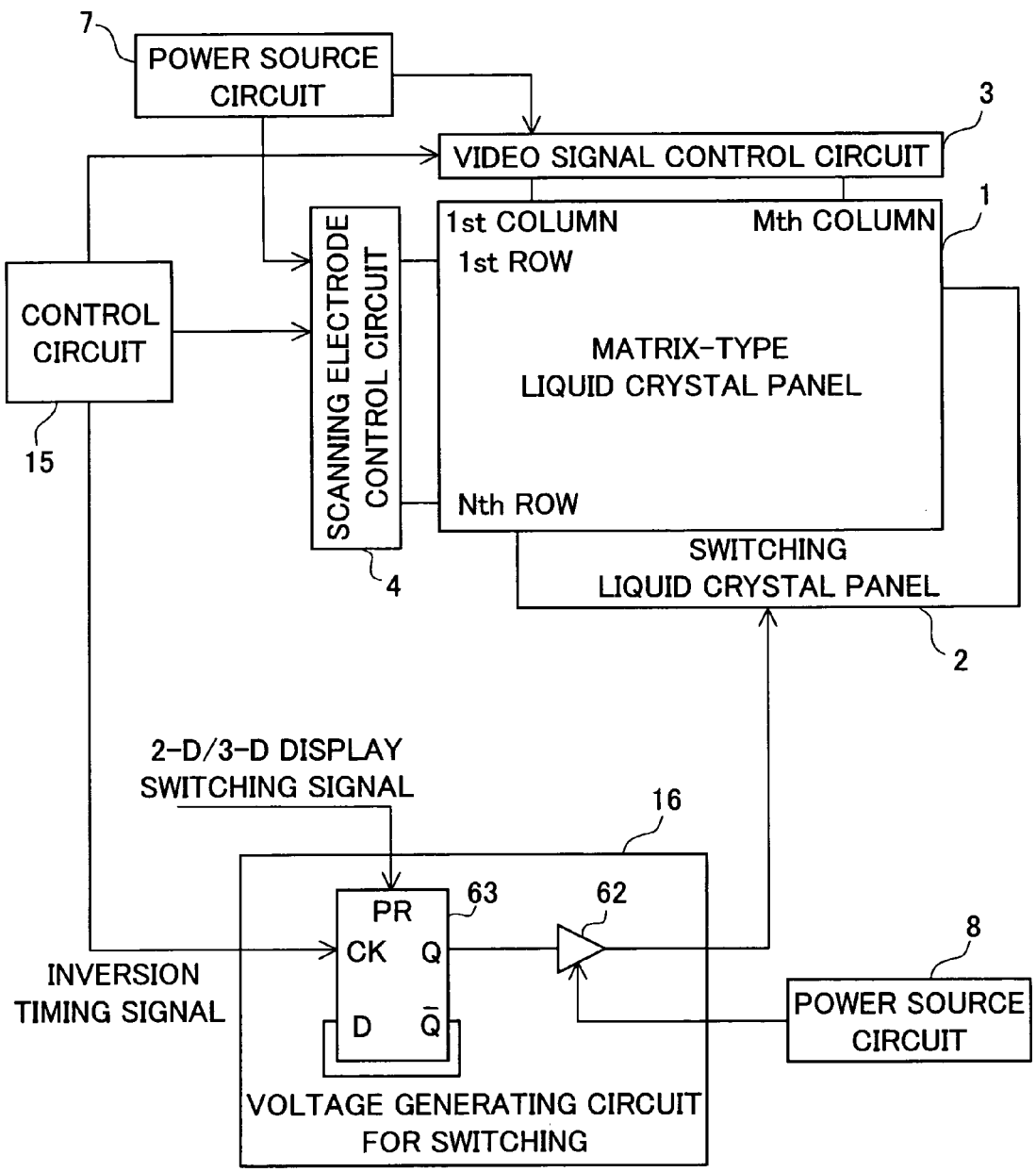
FIG. 3 is a block diagram schematically illustrating a display apparatus according to second exemplary embodiment of the present invention.

FIG. 3 is a block diagram illustrating an arrangement of the display apparatus according to the present embodiment. The present embodiment is different from the first embodiment in that the display apparatus of the second embodiment is provided with a control circuit 15 in lieu of the control circuit 5, and a switching voltage generating circuit 16 in lieu of the switching voltage generating circuit 6, and the control circuit 15 and the switching voltage generating circuit 16 are connected with each other.

The control circuit 15 generates a horizontal synchronizing signal and a vertical display start signal for driving a matrix-type liquid crystal panel 1, and an inversion timing signal representing a timing of polarity inversion of a voltage applied on the switching liquid crystal panel 2. The control circuit 15 outputs, to the switching voltage generating circuit 16, the inversion timing signal that the control circuit 15 generated. A method of generating the inversion timing signal by the control circuit 15 is later described.

The switching voltage generating circuit 16 generates the voltage to be applied on the switching liquid crystal panel 2, and switches over, in accordance with a 2-D/3-D display switching signal inputted in the switching voltage generating circuit 16, whether or not the voltage is to be applied on the switching liquid crystal panel 2. Further, in accordance with the inversion timing signal inputted in the switching voltage generating circuit 16 from the control circuit 15, the switching voltage generating circuit 6 switches over polarity of the voltage to be applied.

The switching voltage generating circuit 16 is provided with a flip-flop 63 and a buffer circuit 62.

The flip-flop 63 receives the 2-D/3-D display switching signal from outside, and the inversion timing signal from the control circuit 15.

If a 2-D/3-D display switching signal representing 3-D display is inputted therein, the flip-flop 63 will not perform the voltage application that applies the voltage on the switching liquid crystal panel 2 via the buffer circuit 62.

On the other hand, if a 2-D/3-D display switching signal representing 2-D display is inputted therein, the flip-flop 63 will perform the voltage application, that is, apply the predetermined voltage on the switching liquid crystal pane 2 via the buffer circuit 62. In performing the voltage application, the flip-flop 63 inverts the polarity of its output voltage in accordance with the inversion timing signal inputted in the flip-flop 63.

As described above, if the 2-D/3-D display switching signal representing the 2-D display is inputted therein, the switching voltage generating circuit 16 will output, to the switching liquid crystal panel 2, the voltage whose polarity has been inverted in accordance with a pulse of the inversion timing signal from the control circuit 15. That is, the switching voltage generating circuit 16 and the control circuit 15 are control means for controlling driving of the switching liquid crystal panel 2.

Figure 4:
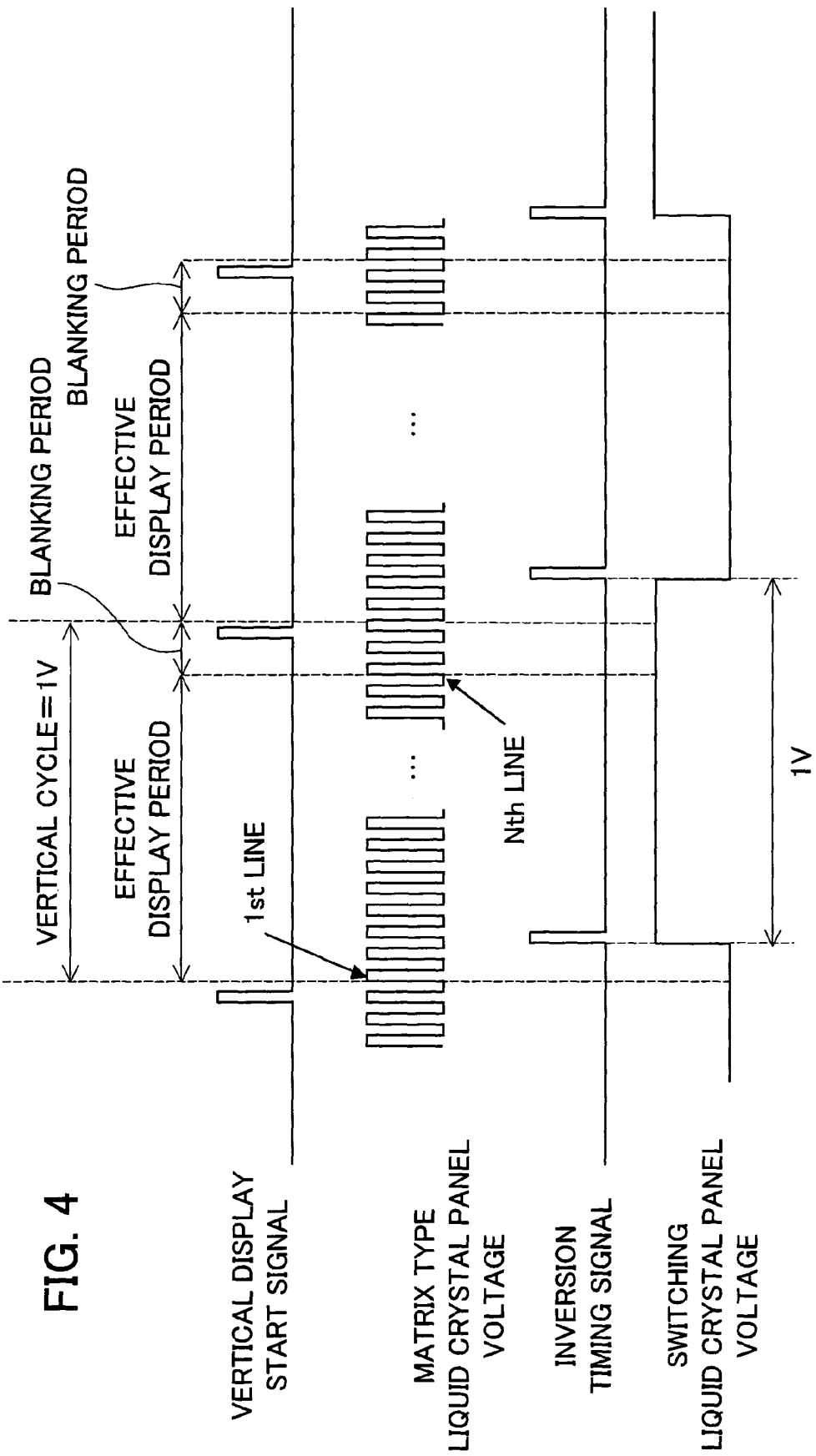
FIG. 4 is a view illustrating an example of waveforms of applied voltages in the display apparatus according to the second exemplary embodiment.
Figure 5:
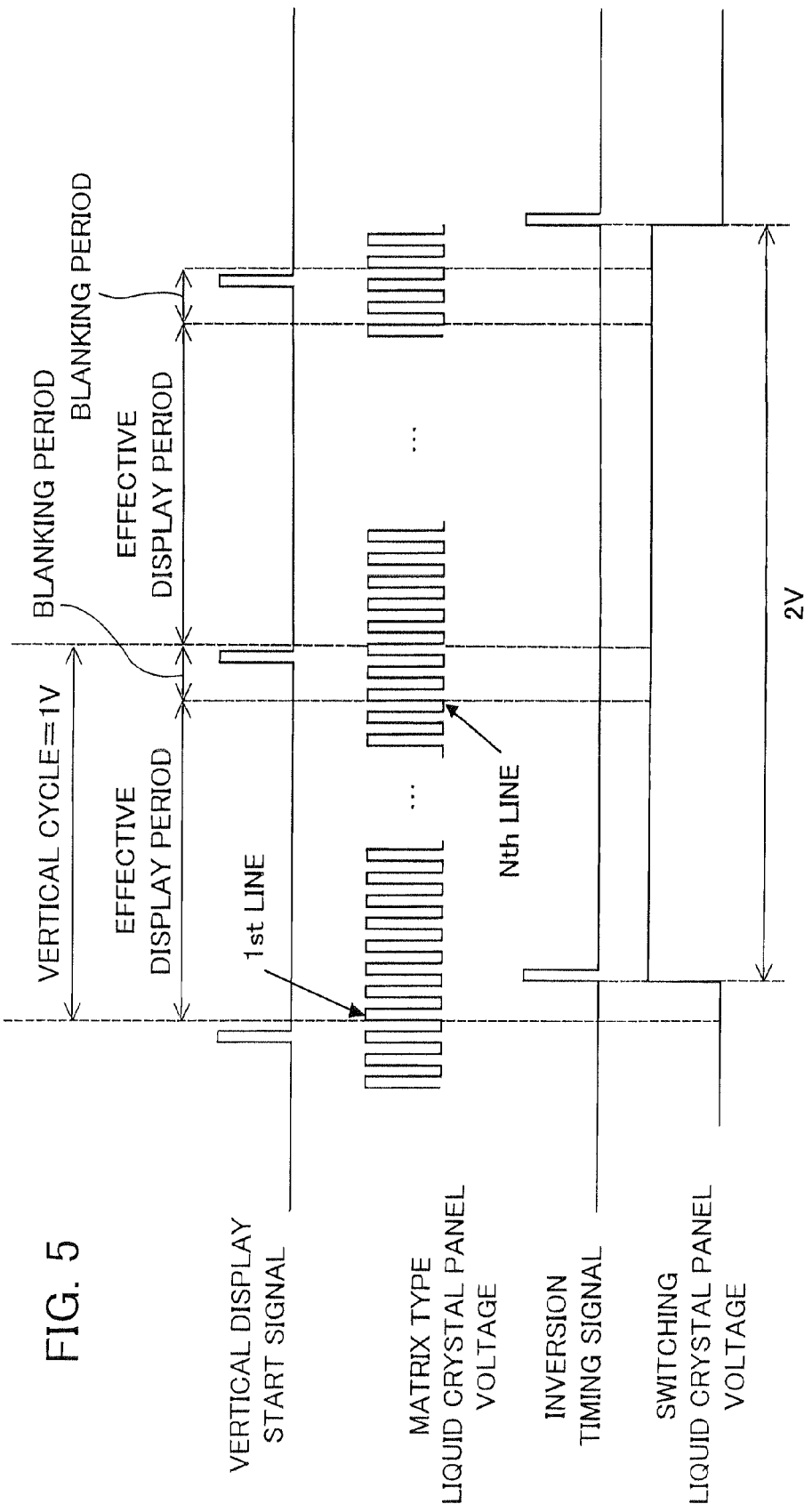
FIG. 5 is a view illustrating another example of waveforms of applied voltages in the display apparatus in the second exemplary embodiment.
Figure 6:
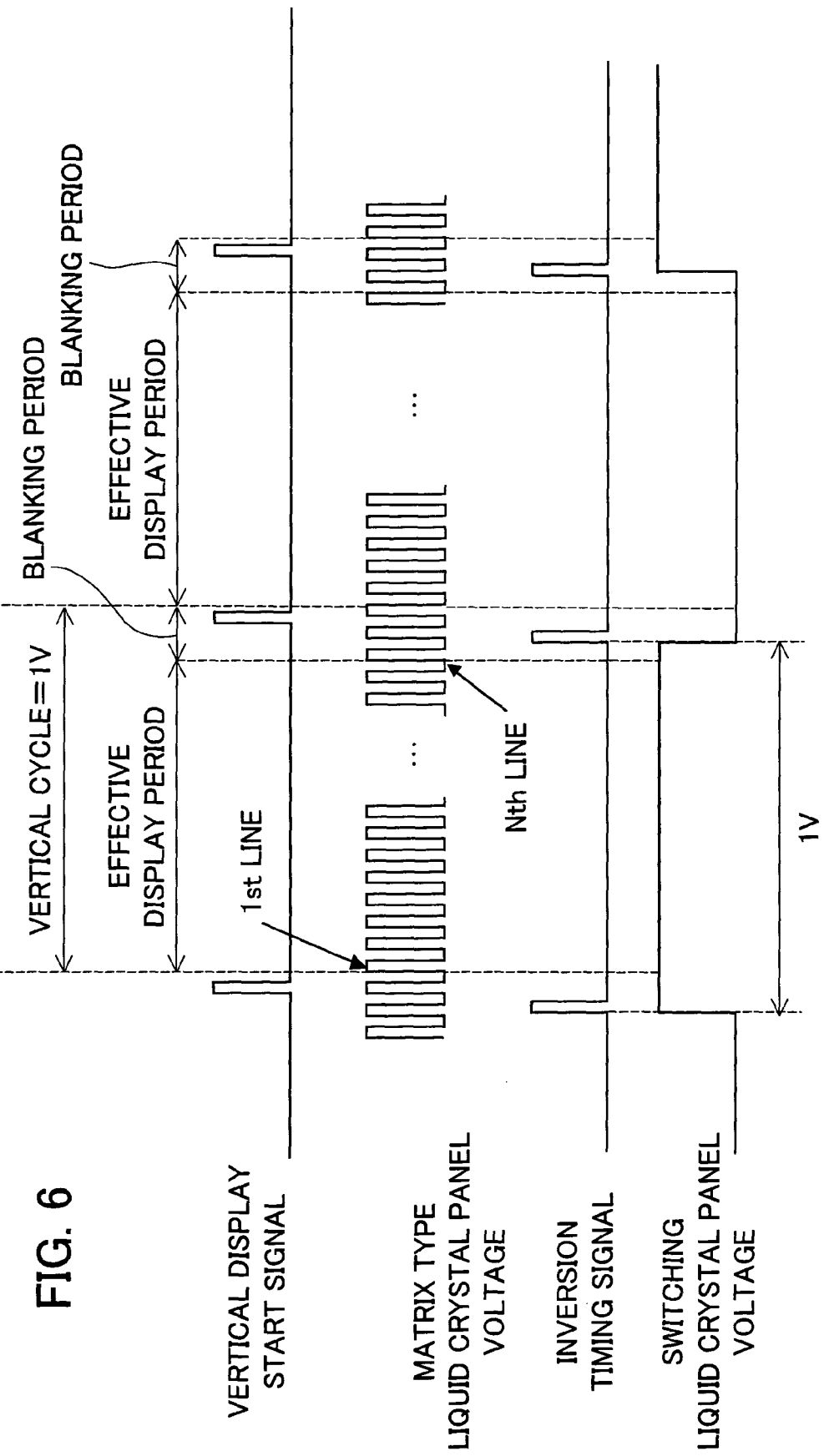
FIG. 6 is a view illustrating another example of waveform of applied voltages in the display apparatus according to the second exemplary embodiment.

In the following, Examples of the inversion timing signal generated by the control circuit 15 are described, referring to FIGS. 4 to 6. Illustrated in FIGS. 4 to 6 are waveforms of signals and voltages in the respective Examples. The signals and voltages are: vertical display start signals; voltages applied on the matrix-type liquid crystal display panel 1; inversion timing signals; and voltages applied on the switching liquid crystal panel 2.

Example 1

The control circuit 15 generates an inversion timing signal that is in synchronism with a cycle (i.e. vertical cycle) of a vertical display start signal. The control circuit 15 outputs to the switching voltage generating circuit 16 the thus generated inversion timing signal. The control circuit 15 generates both of the vertical display start signal and the inversion timing signal. Therefore, cycles of the vertical display start signal and the inversion timing signal can be the same.

FIG. 4 illustrates waveforms of the signals and voltages in the present Example.

As illustrated in FIG. 4, cycles of the vertical display start signal and the inversion timing signal are in synchronism. Thus, polarity of the voltage applied on the switching liquid crystal panel 2 is inverted once in one vertical period. Therefore, the bright line or the dark line appears once on the displayed screen. A number of the bright line or the dark line is less in the present Example than the conventional arrangement.

Moreover, because the cycles of the vertical display start signal and the inversion timing signal are in synchronism, a time lag between these signals is constant in each vertical period. Therefore, the bright line or the dark line appears on a constant position on the displayed screen, but will not flow over the displayed screen. As a result, it renders the bright line or the dark line less visible and harder to recognize. This further improves the display quality of the displayed screen.

Example 2

The control circuit 15 generates an inversion timing signal that is in synchronism with an N-time-greater cycle than the cycle (i.e. vertical cycle) of the vertical display start signal. The control circuit 15 outputs to the switching voltage generating circuit 16 the thus generated inversion timing signal.

FIG. 5 illustrates waveforms of the signals and voltages where N=2.

Because the N-times-greater cycle (in FIG. 5, a double cycle) of the vertical display start signal is in synchronism with the cycle of the inversion timing signal, the polarity of the voltage applied on the switching liquid crystal panel 2 is inverted once in an N number of vertical periods (in FIG. 5, two vertical period). Thus, the bright line or the dark line appears once on the displayed screen in the N number of vertical period (in FIG. 5 two vertical period). This renders the bright line or the dark line less visible.

Moreover, because the cycle of polarity inversion of the voltage applied on the switching liquid crystal panel 2 is longer than in Example 1, it is possible to attain further reduction of the current consumption required by the switching voltage generating circuit 16.

Further, because the N-time-greater cycle of the vertical display start signal and the cycle of the inversion timing signal are in synchronism, a time lag between these signals is constant in each vertical period in which the polarity inversion of the voltage applied on the switching liquid crystal pane 2 is carried out. Therefore, the bright line or the dark line appears on a constant position on the displayed screen. Consequently, as in Example 1, the bright line or the dark line will not flow over the displayed screen and becomes less visible and harder to recognize.

Example 3

The control circuit 15 generates an inversion timing signal that is in synchronism with a cycle (i.e. vertical cycle) of a vertical display start signal. The control circuit 15 outputs the thus generated inversion timing signal to the switching voltage generating circuit 16 in such a manner that a pulse of the inversion timing signal is within the vertical blanking period of the matrix-type liquid crystal panel 1.

The vertical blanking period is that part of one vertical period in which no writing (i.e. supply) of the video signal is carried out with respect to all the pixel electrodes 114. Therefore, all the active elements connected with the pixel electrodes 114 are in an OFF state during the vertical blanking period. The control circuit 15 can calculate out the vertical blanking period easily from the vertical display start signal and the horizontal synchronizing signal. The inversion timing signal that is in synchronism with the vertical cycle is outputted from the control circuit 15 in such a manner that the pulse of the inversion timing signal is within the vertical blanking period which is a period between (a) output of a horizontal synchronizing signal corresponding to pixel electrodes 114 of the Nth row and (b) output of a horizontal synchronizing signal corresponding to pixel electrodes 114 of the 1st row.

The horizontal synchronizing signal for the 1st row is a horizontal synchronizing signal that is firstly outputted after the pulse of the vertical display start signal is outputted. The horizontal synchronizing signal for the Nth row is a horizontal synchronizing signal that is outputted Nthly after the pulse of the vertical display start signal is outputted.

FIG. 6 is a waveform of the signals and voltages in the present Example.

Figure 15:
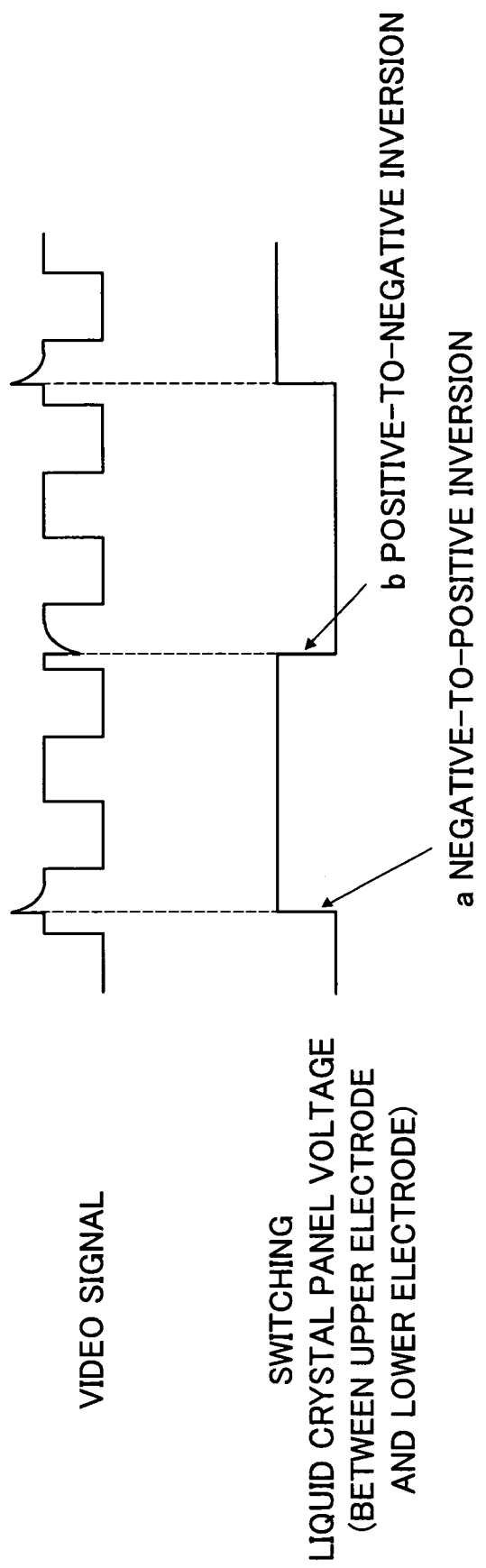
FIG. 15 is a waveform of applied voltages and video signals in the display apparatus illustrated in FIGS. 12 and 13.

As illustrated in FIG. 6, the polarity inversion timing of the voltage applied on the switching liquid crystal panel 2 is within the vertical blanking period of the matrix-type liquid crystal panel 1. Therefore, the fluctuation of the video signal as illustrated in FIG. 15 occurs when the active element is in the OFF state. Therefore, excess charging and insufficient charging of the pixel electrode will not occur. Thus, no bright line nor dark line will be appear in the displayed screen. This allows to display the screen with higher display quality.

Third Embodiment

A third exemplary embodiment (hereinafter, present embodiment in "Third Embodiment") is described below. A display apparatus according to the present embodiment is described below, referring to FIGS. 7 and 8. For the sake of easy explanation, sections having the same functions as those described in the embodiments discussed above are labeled in the same manner and their explanation is omitted here.

Figure 7:
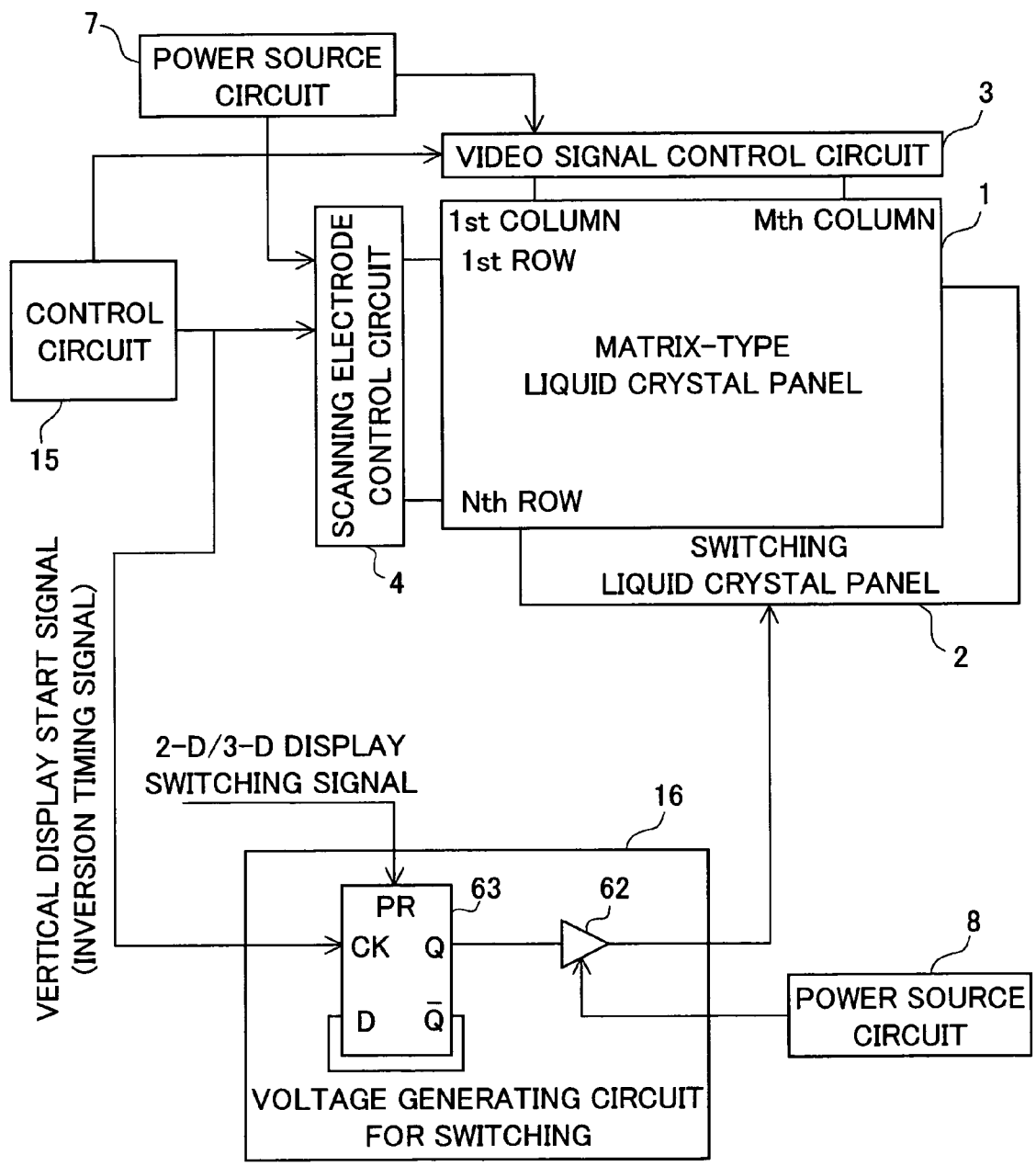
FIG. 7 is a block diagram schematically illustrating a display apparatus according to a third exemplary embodiment of the present invention.

FIG. 7 is a block diagram illustrating an arrangement of the display apparatus of the present embodiment. The present embodiment is different from the embodiment illustrated in FIG. 3 in that a control circuit 15 outputs a vertical display start signal (which the control circuit 15 outputs to a scanning electrode control circuit 4) to a switching voltage generating circuit 16, instead of outputting the inversion timing signal to the switching voltage generating circuit 16.

In other words, the control circuit 15 outputs, to the switching voltage generating circuit 16, the vertical display start signal as an inversion timing signal.

Figure 8:
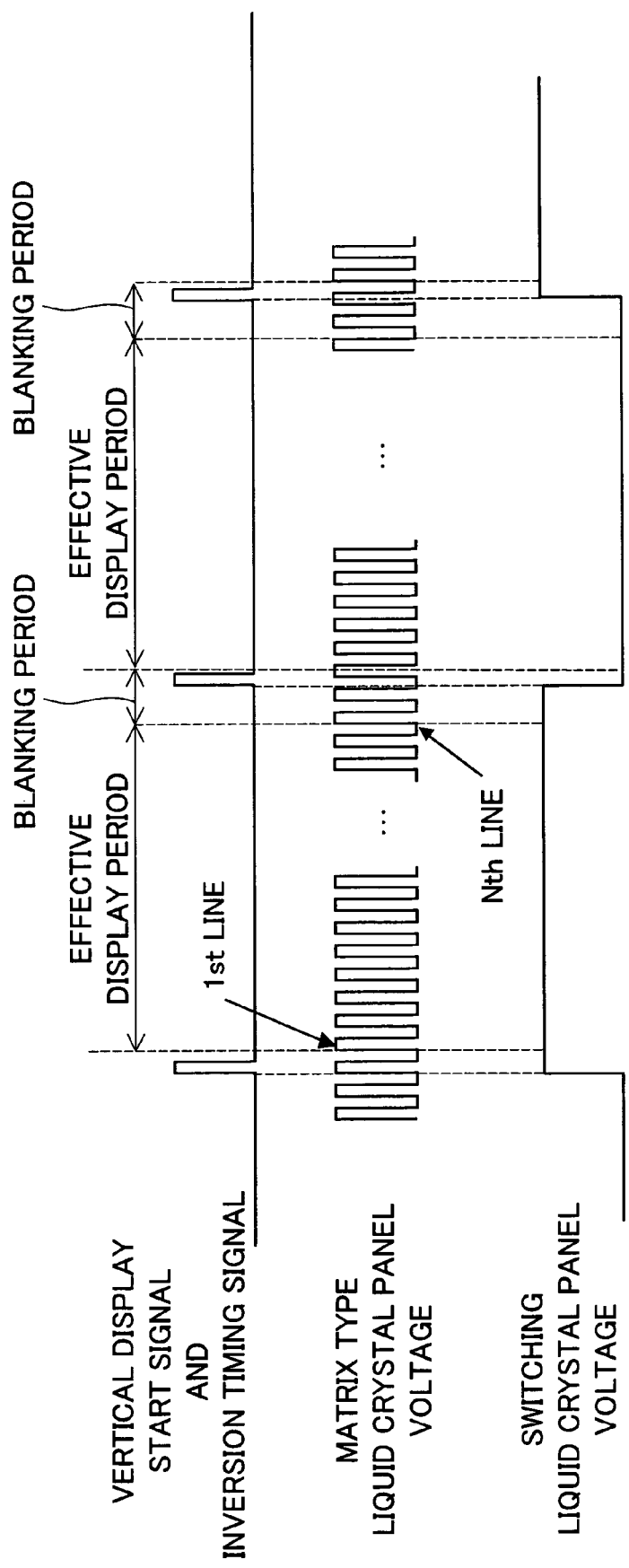
FIG. 8 is a view illustrating waveform of applied voltages in a display apparatus according to the third exemplary embodiment.

FIG. 8 illustrates waveforms of signals and voltages in the present embodiment. As illustrated in FIG. 8, a rise point of the inversion timing signal (vertical display start signal) is within a vertical blanking period. Therefore, the timing of the polarity inversion of a voltage applied on a switching liquid crystal panel 2 is within the vertical blanking period. With this arrangement, as in Example 3, excess charging and insufficient charging of the pixel electrode will not occur. Thus, no bright line nor dark line will appear on the displayed screen. This allows to display the screen with higher display quality.

Moreover, with the control circuit 15, it is possible that one of the vertical display start signal and the inversion timing signal is used to serve as both of the signal. With this arrangement, it is possible to simplify a circuit configuration of the control circuit 15.

Fourth Embodiment

Fourth exemplary embodiment (hereinafter, the present embodiment in "Fourth Embodiment") is an arrangement that makes it possible to further simplify circuit components. A display apparatus according to the present embodiment is described below, referring to FIG. 9. For the sake of easy explanation, sections having the same functions as those described in the embodiments discussed above are labeled in the same manner and their explanation is omitted here.

Figure 9:
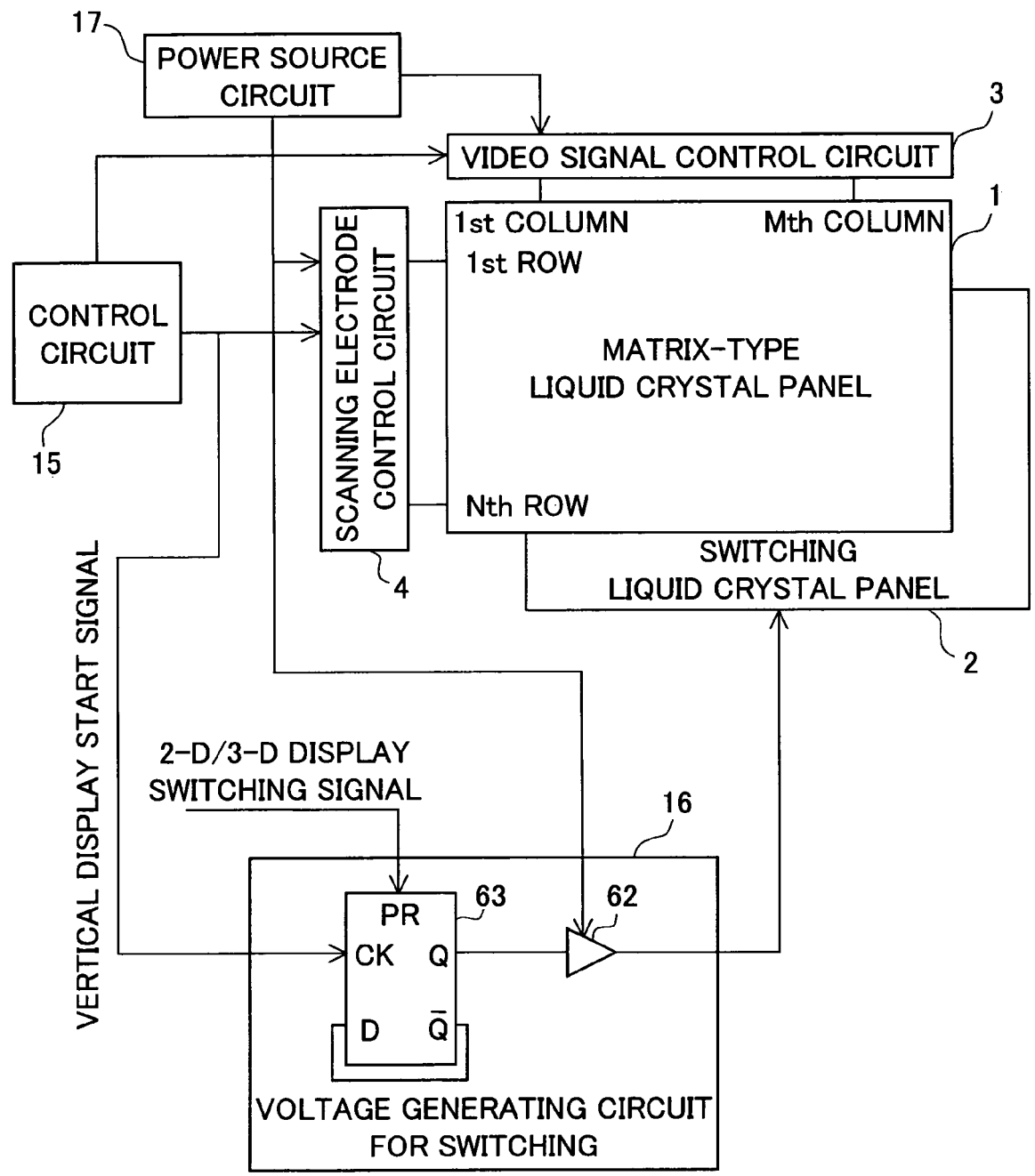
FIG. 9 is a block diagram schematically illustrating a display apparatus according to a fourth exemplary embodiment of the present embodiment.

FIG. 9 is a block diagram illustrating an arrangement of the display apparatus of the present embodiment. The present embodiment is different from the embodiment illustrated in FIG. 7 in that a power source circuit 17 which supplies power both to a matrix-type liquid crystal panel 1 and a switching liquid crystal panel 2 is provided, instead of providing the power source circuit 7 for the matrix-type liquid crystal panel 1 and the power source circuit 8 for the switching liquid crystal panel 2.

The circuit component necessary for configuring a power source circuit can be reduced significantly by adopting the arrangement in which the single power source circuit 17, which is used both for the matrix-type liquid crystal panel 1 and the switching liquid crystal panel 2, is provided. Thus, it is possible to simply a driving circuit for the matrix-type liquid crystal panel 1 and the switching liquid crystal panel 2.

The present embodiment is arranged such that, as illustrated in FIG. 9, the display apparatus is provided with a control circuit 15 and a switching voltage generating circuit 16, and that the control circuit 15 outputs, to the switching voltage generating circuit 16, a vertical display start signal as an inversion timing signal.

However, the present embodiment is not limited to this. The present embodiment may be arranged such that the display apparatus is provided with the control circuit 5 and a switching voltage generating circuit 6 as in the first embodiment, or that the control circuit 15 outputs the inversion timing signal and the vertical display start signal respectively as in the second embodiment. Even if the display apparatus is arranged as such, it is still possible to attain the reduction of the circuit components by utilizing a single power circuit for both the panels.

Fifth Embodiment

An fifth exemplary embodiment (hereinafter, present embodiment in "Fifth Embodiment") is described below, referring to FIG. 10. A display apparatus according to the present embodiment is configured (i.e. apparatus-wise) as in the embodiment illustrated in FIG. 1. Therefore, explanation on the configuration of the present embodiment is omitted here.

In the first embodiment, the switching liquid crystal panel 2 is driven in such a manner that the voltage applied on the upper electrode 122 and the lower electrode 124 (cf. FIG. 12) is inverted. To the contrary, in the present embodiment, a switching liquid crystal panel 2 is driven in such a manner that a direct current (DC) voltage is applied on an upper electrode 122 located between the switching liquid crystal panel 2 and a matrix-type liquid crystal panel 1 and only a lower electrode 124 that is a counter electrode for the upper electrode 122, is subjected to polarity inversion.

Figure 10:
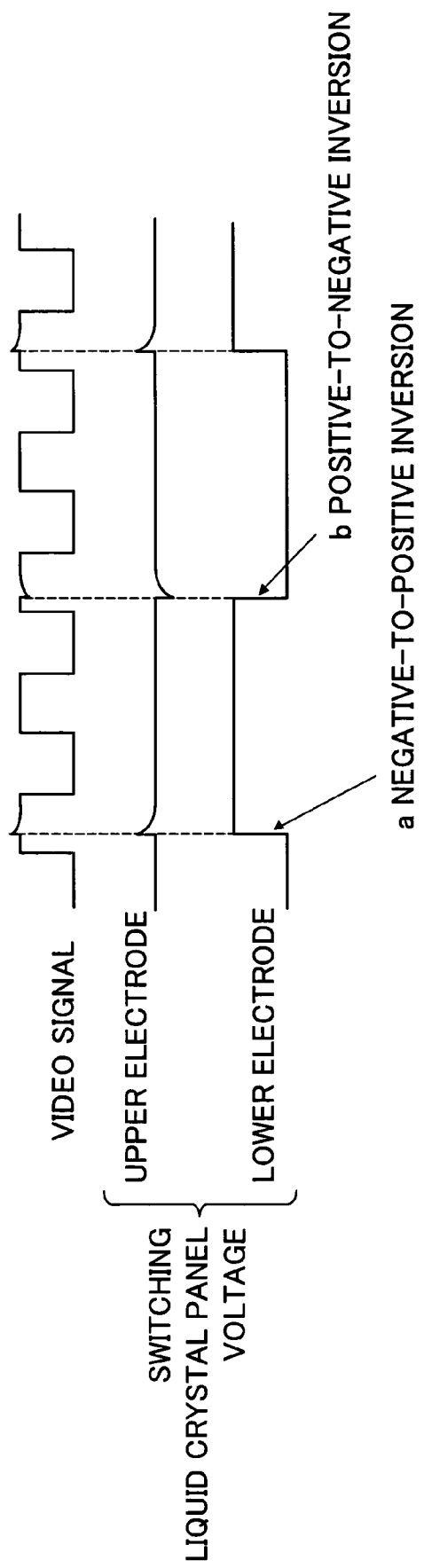
FIG. 10 is a view illustrating waveforms of applied voltages and a video signal in the display apparatus according to the fourth exemplary embodiment.

FIG. 10 illustrates a waveform of a video signal when the switching liquid crystal panel 2 is driven in such a manner that the polarity inversion is carried out only for the lower electrode 124. As illustrated in FIG. 10, the voltage applied on the upper electrode 122 is affected and fluctuated by the polarity inversion of the voltage applied on the lower electrode 124. This is due to capacity coupling occurred between the upper electrode 122 and the lower electrode 124. Because the upper electrode 122 has a sufficiently small resistance and thus a current supplying capability to the upper electrode 122 is sufficient, the fluctuation occurred in the upper electrode 122 is smaller than the fluctuation occurred in the lower electrode 124. Therefore, a fluctuation amount of the video signal in the matrix-type liquid crystal panel 1 due to the capacity coupling occurred between the upper electrode 122 and a pixel electrode 114 of the matrix-type liquid crystal panel 1 is small.

As a result, it is possible to attain reduction in an amount of excess charging or insufficient charging (which occurs when the polarity inversion is carried out) of the pixel electrode 114 of the matrix-type liquid crystal panel 1. (i.e. it is possible to alleviate the excess charging or insufficient charging). Therefore, a difference between brightness of the bright line or dark line on the displayed screen and brightness other area of the screen than the bright line or dark line becomes small. Thus, the bright line or dark line becomes less visible and harder to recognize. This improves the display quality of displayed screen.

The present embodiment may be applied together with the first to fourth embodiments, respectively or in combination. That is, the switching liquid crystal panel 2 of the present embodiment may be arranged such that a DC voltage is applied the upper electrode 122 positioned between the matrix-type liquid crystal panel 1 and the switching liquid crystal panel 2 and only the lower electrode 124, which is a counter electrode of the upper electrode 122, is subjected to the polarity inversion. With this arrangement, it is possible to reduce a fluctuation amount of the video signal in the matrix-type liquid crystal panel 1, thereby rendering the bright line or dark line on the displayed screen further less visible and harder to recognize.

Figure 11:
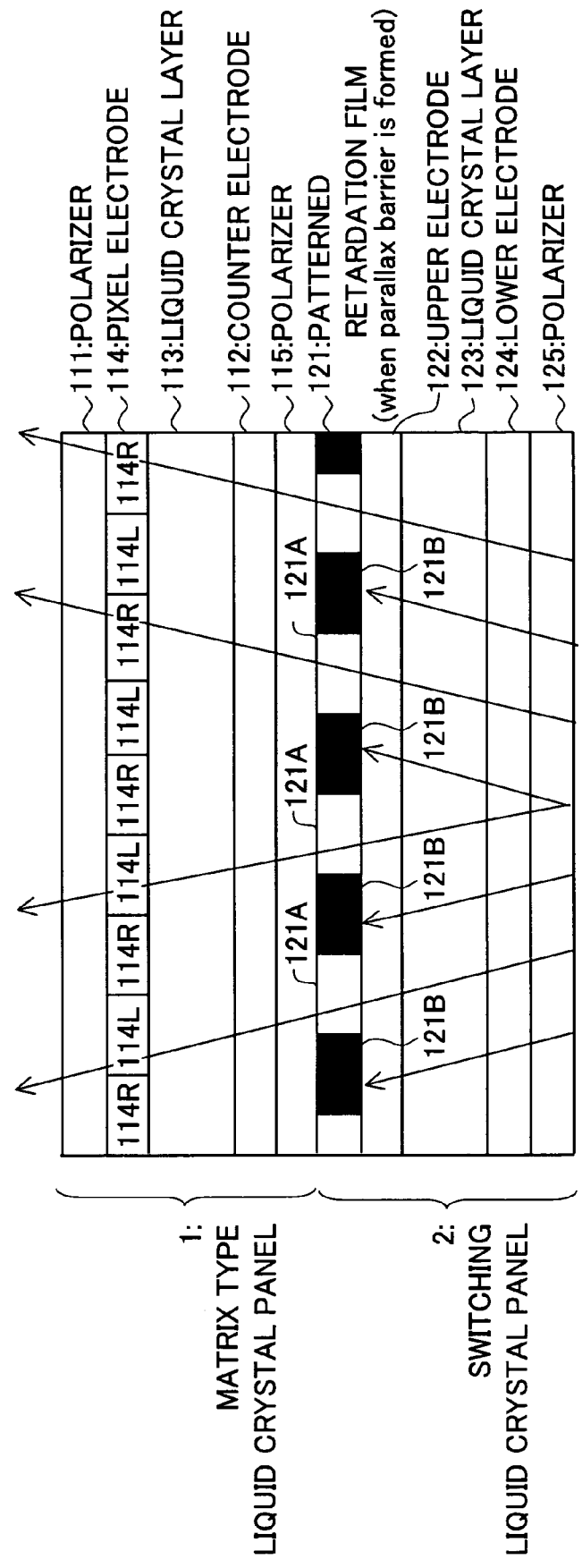
FIG. 11 is a cross sectional view illustrating a display apparatus according to a modification of the fourth exemplary embodiment.

Even though in the present embodiment the switching liquid crystal panel 2 is arranged such that the DC voltage is applied on the upper electrode 122 (of the switching liquid crystal panel 2) located between the switching liquid crystal panel 2 and the matrix-type liquid crystal panel 1, the present invention is. however, not limited to this arrangement. The matrix-type liquid crystal panel 1 may be arranged such that a DC voltage is applied on its electrode located between the switching liquid crystal panel 2 and the matrix-type liquid crystal panel 1. That is, as illustrated in FIG. 11, the matrix-type liquid crystal panel 1 and the switching liquid crystal panel 2 are assembled such that the counter electrode 112 of the matrix-type liquid crystal panel 1 is located between the matrix-type liquid crystal panel 1 and the switching liquid crystal panel 2. The application of the DC voltage on the counter electrode 112 of the matrix-type liquid crystal panel 1 causes the pixel electrode 114 less susceptible from the polarity inversion of the voltage applied on the switching liquid crystal panel 2. This reduces the amount of the excess charging and the insufficient charging. As a result, the bright line or the dark line becomes less visible and harder to recognize.

Moreover, even though the above explanation discusses the case where the liquid crystal panel assembled together with the matrix-type display apparatus is the 2-D/3-D display switching liquid crystal panel, the present invention is not limited to this. In other words, the liquid crystal panel assembled together with the matrix-type display apparatus may be any liquid crystal panel, provided that it is provided with an electrode that can be capacity-coupled with the pixel electrode of the matrix-type display apparatus.

For example, the liquid crystal panel assembled together with the matrix-type display apparatus may be a liquid crystal display panel that, when displaying in a first display state, it displays a screen having a first display region and a second display region, which are segmented by a parallax barrier means, and on which different image sources are displayed respective, and that it displays an image source on an entire screen region when displaying in a second display state.

Even though the above exemplary embodiments discusses, by way of example, the switching liquid crystal panel 2 is provided with two electrodes, namely the upper electrode 122 and the lower electrode 124, the present invention is not limited to this arrangement. The switching liquid crystal panel 2 may be a matrix-type liquid crystal panel.

As described above, a method according to the present invention is for driving a display apparatus having an image display section for displaying a screen by controlling pixels in accordance with image data per vertical period, the pixels arranged in matrix, and a liquid crystal panel having an electrode pair sandwiching a liquid crystal layer therebetween, the image display section and the liquid crystal panel assembled together. The method according to the present invention includes the step of inverting polarity of a voltage to be applied on the electrode pair once in substantially one or more vertical periods.

Further, in addition to the above arrangement, the method according to the present invention is preferably arranged such that the polarity of the voltage to be applied on the electrode pair is inverted in a cycle same as the vertical period.

In the method, the vertical cycle of the image display apparatus and the polarity inversion cycle of the voltage applied on the electrode pair are the same. Thus, according to the present invention, the time lag between the timing of the inversion of the polarity and the start point of the vertical period of the image display means is constant in each vertical period. In other words, the polarity inversion timing is constant in each vertical period. With this, that position on the screen at which the bright line or the dark line occur is always the same. As a result, the bright line or the dark line becomes less visible and harder to recognize, thereby improving the display quality.

Further, in addition to the above arrangement, the method according to the present invention is preferably arranged such that the polarity of the voltage to be applied on the electrode pair is inverted in a cycle N times greater than the vertical period, where N is an integer not less than 2.

According to the method, the dark line or the bright line, which occurs when the polarity of the voltage applied on the liquid crystal panel is inverted, occurs only once in the N number of vertical periods.

Further, in the vertical period of the image display apparatus, the timing of the polarity inversion is constant. In other words, the polarity inversion timing is constant in each vertical period. With this, that position on the screen at which the bright line or the dark line occur is always the same. As a result, the bright line or the dark line becomes less visible and harder to recognize, thereby further improving the display quality.

Moreover, in addition to the above arrangement, the method according to the present invention is preferably arranged such that the polarity of the voltage to be applied on the electrode pair is inverted within a vertical blanking period of the image display section.

Here, the vertical blanking period is that part of one vertical period in which no wring of image data (that is, controlling of the pixel in accordance with the image data) is carried out for any pixel.

According to the driving method in which the polarity inversion of the voltage applied on the liquid crystal panel is carried out in the vertical blanking period, the excess charging of the pixel or the insufficient charging of the pixel due to the polarity inversion never occurs. Thus, no bright line or dark line appears. This improves the display quality.

Further, in addition to the above arrangement, the method according to the present invention is preferably arranged such that the polarity of the voltage to be applied on the electrode pair is inverted in synchronism with start of the vertical period.

According to the method, the start point of the vertical period is within the vertical blanking period in which no writing of the image data is carried out for any pixel. Thus, in the method, the polarity of the voltage applied on the liquid crystal panel is inverted within the vertical blanking period. Thus, no bright line or dark line appears on the displayed screen, thereby improving the display quality.

Moreover, the start point of the vertical period and the polarity inversion point of the voltage applied on the liquid crystal panel is concurrent. This allows the display apparatus to use the same arrangement in order to control the vertical period of the image display means and to control the polarity inversion timing of the voltage applied on the liquid crystal panel. This allows simplification of the circuit configuration of the display apparatus.

Further, in addition to the above arrangement, the method according to the present invention is preferably arranged to include the step of applying a direct current voltage on that electrode of the electrode pair which is located between the image display section and the liquid crystal panel.

According to the method, the DC current is applied on that electrode of the electrode pair which is located between the image display apparatus and the liquid crystal panel. Because of this, a potential of the other electrode of the electrode pair is changed when the polarity of the voltage applied on the electrode pair is inverted (the other electrode is located on that surface of the liquid crystal panel which does not face the image display apparatus). When this occurs, capacity coupling between the electrode and the other electrode of the electrode pair causes the electrode to be affected from the potential change occurred in the other electrode. However, because the DC current is applied thereon, the electrode located between the image display apparatus and the liquid crystal panel is generally less susceptible from the other electrode potential, and thus the amount of the potential change is small. Therefore, the amount of the change in the image data of the image display means due to the polarity inversion of the voltage applied on the liquid crystal panel is small.

As a result, the difference between the brightness of the bright line or the dark line occurred when the polarity inversion occurs and the brightness of the other region of the screen becomes small. This causes the bright line or the dark line to be less visible and harder to recognize. This further improves the display quality of the displayed screen.

Further, in addition to the above arrangement, the method is preferably arranged such that the image display section comprises a liquid crystal layer and an electrode pair sandwiching the liquid crystal layer, and the method comprises the step of applying a direct voltage on that electrode of the electrode pair of the image display section which is located between the image display section and the liquid crystal panel.

According to the method, the DC current is applied on that electrode of the electrode pair of the image display apparatus which is located between the image display apparatus and the liquid crystal panel. Thus, this electrode is less susceptible from the change in the potential of the other electrode of the electrode pair of the image display apparatus. Therefore, the amount of the potential change of this electrode is small. Therefore, that other electrode of the electrode pair of the image display apparatus which is located on that surface of the image display apparatus which does not face the liquid crystal panel becomes less susceptible from the influence of the potential inversion of the voltage applied on the liquid crystal panel. As a result, the amount of the excess charging or the insufficient charging is reduced. With this, the amount of change in the image data of the image display apparatus due to the polarity inversion of the voltage applied on the liquid crystal panel becomes small. Consequently, the bright line or the dark line occurred when the polarity inversion is carried out becomes further less visible and harder to recognize.

Furthermore, a display apparatus according to the present invention is provided with a control circuit (control means, control section), which realizes any one of the methods of driving.

According to the arrangement, it is possible to prevent display quality deterioration caused by the bright line or the dark line.

Further, according to the above arrangement, the display apparatus according to the present invention is preferably arranged such that a power source is used for applying the voltage in accordance with the image data in the image display section and for applying the voltage on the electrode pair of the liquid crystal panel.

With this arrangement, it is sufficient to provide one power source both for the image display apparatus and the liquid crystal panel. This allows circuit simplification.

As described above, the method of driving the display apparatus and the display apparatus according to the present invention make it possible to reduce the influence given on the image display means from the polarity inversion of the voltage applied on the liquid crystal panel. Therefore, the method and the display apparatus are suitably applicable to and as a display apparatus provided with a plurality of liquid crystal panels.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A method of driving a display apparatus comprising: providing an image display section for displaying a screen by controlling pixels in accordance with image data per vertical period, the pixels arranged in matrix, and providing a liquid crystal panel for switching between a 2D display and a 3D display of the apparatus so as to comprise an electrode pair sandwiching a liquid crystal layer therebetween, the image display section and the liquid crystal panel assembled together, so that the image display section includes a first liquid crystal layer and the liquid crystal panel includes a second liquid crystal layer spaced apart from the first liquid crystal layer;
wherein the image display section and the liquid crystal panel are proximate to each other and are facing each other; and
applying an inversion timing signal for inverting polarity of a voltage to be applied on the electrode pair included in the liquid crystal panel, said liquid crystal panel used for switching between a 2D display and a 3D display synchronized with the rising edge of the inversion timing signal, the inversion timing signal occurring once in two or more vertical periods of the image display section.

2. A method as set forth in claim 1, wherein: the polarity of the voltage to be applied on the electrode pair is inverted in a cycle N times greater than the vertical period, where N is an integer not less than 2.

3. A method as set forth in claim 1 wherein: the polarity of the voltage to be applied on the electrode pair is inverted within a vertical blanking period of the image display section.

4. A method as set forth in claim 1 wherein: the polarity of the voltage to be applied on the electrode pair is inverted in synchronism with start of the vertical period.

5. A method as set forth in claim 1, comprising the step of: applying a direct current voltage on that electrode of the electrode pair which is located between the image display section and the liquid crystal panel.

6. A method as set forth in claim 1 wherein: the image display section comprises a liquid crystal layer and an electrode pair sandwiching the liquid crystal layer; the method further comprising applying a direct voltage on that electrode of the electrode pair of the image display section which is located between the image display section and the liquid crystal panel.

7. A display apparatus comprising an image display section for displaying a screen by controlling pixels in accordance with image data per vertical period, the pixels arranged in matrix, and a liquid crystal panel having an electrode pair sandwiching a liquid crystal layer therebetween for switching between a 2D display and a 3D display, the image display section and the liquid crystal panel assembled together,
wherein the image display section includes a first liquid crystal layer and the liquid crystal panel includes a second liquid crystal layer spaced apart from the first liquid crystal layer;
wherein the image display section and the liquid crystal panel are proximate to each other and are facing each other; and
a control section for inverting by applying an inversion timing signal, once in two or more vertical periods of the image display section, polarity of a voltage applied on the electrode pair included in the liquid crystal panel, said liquid crystal panel used for switching between a 2D display and a 3D display synchronized with the rising edge of the inversion timing signal.

8. A display apparatus as set forth in claim 7, wherein: a power source is used for applying the voltage in accordance with the image data in the image display section and for applying the voltage on the electrode pair of the liquid crystal panel.

9. A display apparatus as set forth in claim 7, wherein: the control section controls (a) an inversion timing of the polarity of the voltage to be applied on the electrode pair, and (b) a start timing of each vertical period.

10. A display apparatus as set forth in claim 9, wherein: the control section synchronizes the inversion timing and the start timing.

11. The method of claim 1, wherein the image display section and the liquid crystal panel are proximate and parallel to each other, so that the image display section includes a first liquid crystal layer and the liquid crystal panel includes a second liquid crystal layer spaced apart from the first liquid crystal layer.

12. The display apparatus of claim 7, wherein the image display section and the liquid crystal panel are proximate and parallel to each other, so that the image display section includes a first liquid crystal layer and the liquid crystal panel includes a second liquid crystal layer spaced apart from the first liquid crystal layer.

* * * * *